United States Patent [19]

Jentsch

[11] Patent Number: 4,937,913

[45] Date of Patent: Jul. 3, 1990

[54] DOOR CLOSER

[75] Inventor: Dietrich Jentsch, Ennepetal, Fed. Rep. of Germany

[73] Assignee: DORMA GmbH & Co. KG., Ennepetal, Fed. Rep. of Germany

[21] Appl. No.: 272,122

[22] Filed: Nov. 16, 1988

[30] Foreign Application Priority Data

Dec. 12, 1987 [DE] Fed. Rep. of Germany ....... 3742213

[51] Int. Cl.[5] ............................................... F16F 9/48

[52] U.S. Cl. .................................. 16/58; 16/DIG. 9; 16/51; 188/316; 188/286

[58] Field of Search ................... 16/51, 52, 58, 62, 64, 16/69, 76, 79, 84, 85, DIG. 9, DIG. 10, DIG. 21; 188/316, 317, 318, 286, 287, 322.22

[56] References Cited

U.S. PATENT DOCUMENTS

| | | | |
|---|---|---|---|
| 2,714,429 | 8/1955 | Etherton | 188/317 |
| 3,487,494 | 1/1970 | Baan | 16/51 |
| 4,064,977 | 12/1977 | Taylor | 188/317 |
| 4,166,522 | 9/1979 | Bourcier de Carbon | 188/317 |
| 4,660,250 | 4/1987 | Tillman et al. | 16/58 |

*Primary Examiner*—Richard K. Seidel
*Assistant Examiner*—James Miner
*Attorney, Agent, or Firm*—Peter K. Kontler

[57] ABSTRACT

A door closer wherein a housing defines a fluid-containing space and rotatably supports a shaft which is articulately connected with a pivotable door panel. A piston in the housing divides the space into a chamber and a compartment and has a toothed rack which mates with a pinion on the shaft so that the piston moves in the housing in response to rotation of the shaft as a result of pivoting of the door panel and vice versa. One or more springs in the chamber bias the piston in a direction to pivot the door panel toward closed position. A channel in the housing establishes communication between the chamber and the compartment during an initial stage of movement of the door panel from closed position at which time the piston moves in a direction to reduce the volume of the chamber. A bypass in the piston provides a path for the flow of fluid from the chamber into the compartment during a following stage of pivoting of the door panel toward open position, and the cross-sectional area of such path increases gradually in a direction from the chamber toward the compartment. The bypass can be provided in the peripheral surface of the piston or in the peripheral surface of the body of a check valve which is installed in the piston and serves to permit the fluid to flow from the compartment into the chamber during pivoting of the door panel toward closed position.

12 Claims, 1 Drawing Sheet

DOOR CLOSER

BACKGROUND OF THE INVENTION

The invention relates to improvements in apparatus, known as door closers or door checks, which serve to control the movements of door panels or like components between first and second positions. More particularly, the invention relates to improvements in apparatus of the type wherein the movement of a component (hereinafter called door panel) toward open position is opposed by one or more springs or other suitable biasing means, and wherein a piston in the housing of the apparatus forms part of a fluid-operated damper which is operative at least while the door panel moves from closed toward open position It is known to provide a door closer with a shaft which is rotatably journalled in an elongated fluid-containing housing and is operatively connected with a pivotable door panel. The shaft cooperates with a piston which is reciprocable in the housing so that the piston moves in the housing in response to rotation of the shaft by the door panel and vice versa. The piston divides the internal space of the housing into at least one chamber and a compartment and is provided with a check valve which permits the fluid to flow from the compartment into the chamber. The housing of such door closer defines a channel which permits the fluid to flow from the chamber into the compartment during the initial stage of pivoting of the door panel from its closed position. The channel is sealed from the chamber upon completion of the initial stage of such movement, and the rate of outflow of fluid from the chamber (in response to further pivoting of the door panel from the closed position toward the fully open position) is thereupon regulated by a throttle valve. Reference may be had to German Offenlegungsschrift No. 33 31 783 of Schnarr et al. This publication discloses a door closer wherein the housing for the reciprocable piston defines a chamber surrounding the head of the piston during a certain stage of movement of the piston relative to the housing while the door panel moves from its closed toward its open position. The chamber communicates with a channel which is provided in the housing and extends along that portion of the housing which contains a spring serving as a means for biasing the door panel to its closed position. An adjustable throttle valve in the housing controls the flow of fluid in the channel. Proper setting of such throttle valve must be selected by trial and error. As a rule, the setting of the valve is such that it brings about an insufficient or an excessive damping action by failing to adequately restrict the flow of fluid in the channel or by excessively restricting such flow. If the valve is set to fully seal or to practically seal the channel, the door panel cannot be moved beyond that (intermediate) position in which the piston is surrounded by the chamber in the housing of the door closer. Attempts to pivot the door panel beyond such intermediate position can result in damage to or in total destruction of the door closer, of the linkage between the door closer and the panel, of the means for securing the door closer to the door panel and/or of the hinge or hinges for the door panel. Attempts to overcome the drawbacks of the just described door closer include the utilization of pressure relief valves which open when the pressure in the chamber reaches a preselected maximum value. The utilization of pressure relief valves is not a satisfactory solution since they deactivate the door closer under circumstances when its controlling action is most desirable, e.g., when a person or a vehicle propels the door panel from the closed position with a great force which must be effectively resisted by the door closer.

OBJECTS OF THE INVENTION

An object of the invention is to provide a simple and inexpensive but highly reliable door closer which is effective during each and every stage of movement of a door panel or a like component between two end positions.

Another object of the invention is to provide a door closer which is constructed and assembled in such a way that it can effectively oppose rapid pivoting of a door panel to a fully open position during that stage of such pivotal movement when the customary path for the flow of damping fluid is already sealed.

A further object of the invention is to provide a novel and improved damping piston for use in the above outlined door closer.

An additional object of the invention is to provide a novel and improved check valve for use in the above outlined door closer.

Still another object of the invention is to provide the door closer with novel and improved means for controlling the damping action upon a door panel during the last stage or stages of movement of such panel to one of its end positions.

A further object of the invention is to provide a door which embodies the above outlined door closer.

Another object of the invention is to provide a novel and improved bypass for hydraulic fluid which can be used in the above outlined door closer.

An additional object of the invention is to provide a novel and improved method of regulating the movements of a mobile component, such as a pivotable door panel, between two end positions.

A further object of the invention is to provide the door closer with simple, compact and inexpensive but effective means for preventing damage to or destruction of the door panel, of hinges for the door panel and/or of the door closer as a result of abrupt application of large forces in a direction to propel the door panel toward open position.

Another object of the invention is to provide a door closer which can effectively control pivotal movements of a door panel without the need for pressure relief valves, adjustable throttle valves and like parts

SUMMARY OF THE INVENTION

The invention is embodied in an apparatus for controlling movements of a pivotable door panel or a like component between first and second positions, especially between open and closed positions. The improved apparatus comprises a preferably elongated housing having a fluid-containing space, and a piston which is installed in the housing for movement in a first direction during movement of the component from closed position and in a second direction during movement of the component toward closed position. The piston divides the space in the housing into at least one chamber and a compartment, and the piston is arranged to expel fluid from the chamber during movement in the first direction. The apparatus further comprises channel means provided in the housing and defining a first path for the flow of fluid from the chamber into the compartment during a first stage of movement of the piston in the first direction, and a bypass which is provided in the piston and defines a second path for the flow of fluid from the chamber into the compartment during a following second stage of movement of the piston in the first direction. The cross-sectional area of the second path increases (preferably gradually) in a direction from the chamber toward the compartment.

The bypass can include a groove which is machined into or is otherwise formed in the peripheral surface of the piston. Alternatively, the bypass can include a groove in the peripheral surface of the body of a check valve which is installed in the piston and serves to admit fluid from the compartment into the chamber when the pressure in the chamber drops during movement of the piston in the second direction. The groove in the peripheral surface of the piston or in the peripheral surface of the body of the check valve can have a triangular cross-sectional outline. The arrangement is preferably such that the width and/or the depth of the groove increases in a direction from the chamber toward the compartment. The minimum cross-sectional area of the first path exceeds the minimum cross-sectional area of the second path so that the fluid finds the (first) path of least resistance to flow from the chamber into the compartment during the first or initial stage of movement of the piston in the first direction.

The apparatus further comprises means for biasing the piston in the second direction. Such biasing means can include one or more springs which are installed in the chamber to react against the housing and to bear against the piston.

The piston can include a portion (such as a head) which is provided with the bypass, which seals the channel means from the chamber during the second stage of movement of the piston from its first position, i.e., the channel means is effectively sealed and cannot permit the fluid to flow therethrough while the piston continues to move in the first direction and thereby compels the fluid (e.g., oil) to leave the chamber by way of the bypass.

The apparatus preferably further comprises a rotary member (such as a shaft which extends transversely of the directions of movement of the piston in the housing) which is rotatably journalled in the housing, and means for transmitting motion between the rotary member and the piston so that the piston moves in the housing in response to rotation of the rotary member and the rotary member rotates in response to movement of the piston in the housing. A linkage or the like can be provided to connect the rotary member to the component. The motion transmitting means can comprise a toothed rack on the piston and a gear which is provided on the rotary member and meshes with the rack.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figures 1, 2, 3, 4, 5:
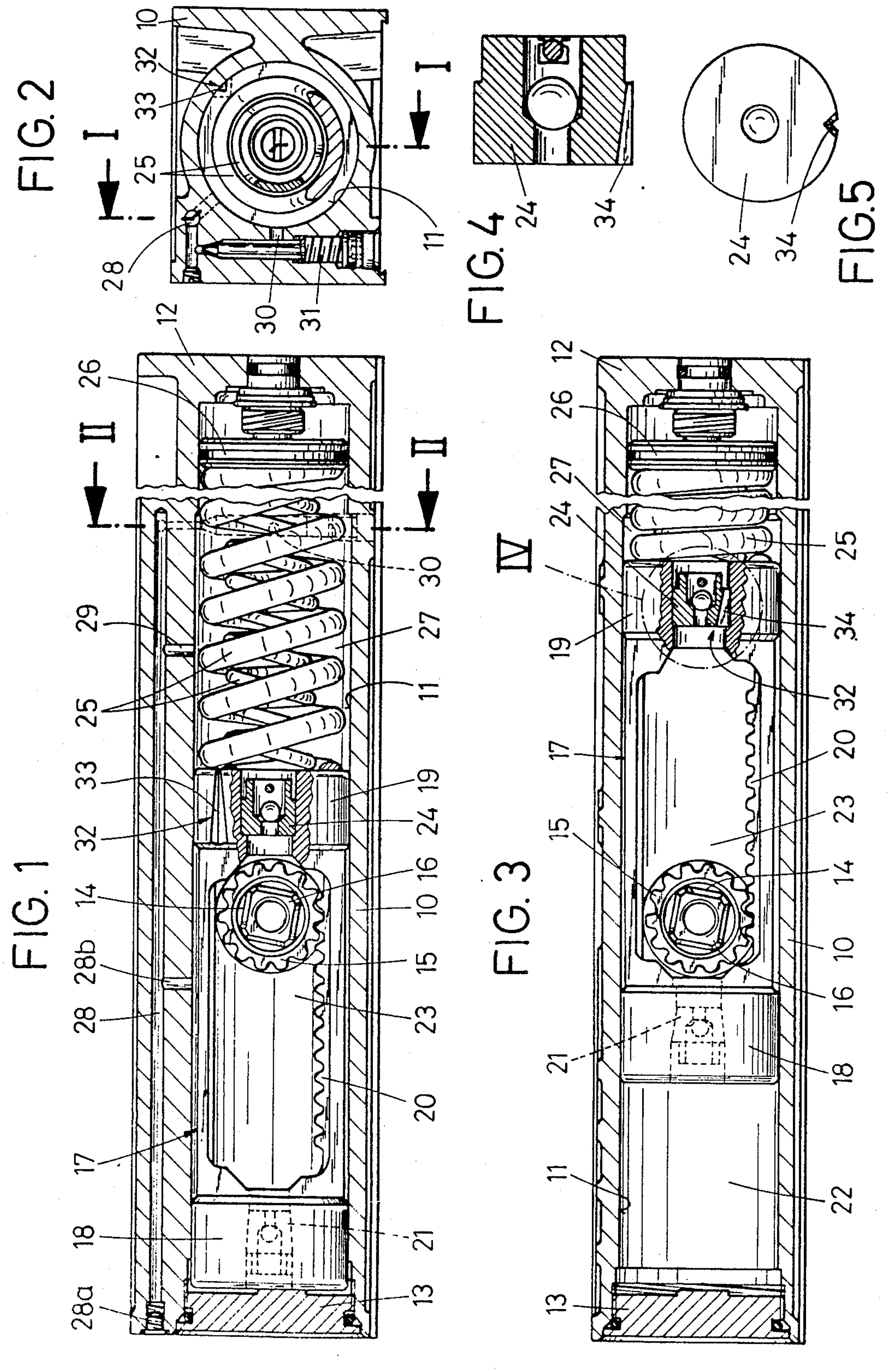
FIG. 1 is a longitudinal sectional view of an apparatus which constitutes a first door closer and wherein the bypass includes a groove in the peripheral surface of the piston, the section being taken in the direction of arrows substantially as seen from the line I—I of FIG. 2 and the piston being shown in a position it assumes when the component which is controlled by the apparatus is maintained in a closed position.
FIG. 2 is a transverse sectional view as seen in the direction of arrows from the line II—II of FIG. 1.
FIG. 3 is a longitudinal sectional view of a second apparatus wherein the bypass includes a groove in the peripheral surface of a check valve in the piston, the channel means being omitted and the piston being shown in a position it assumes when the component which is controlled by the apparatus is in fully open position.
FIG. 4 is an enlarged view of a detail within the phantom-line circle IV in FIG. 3, showing the check valve in the piston.
FIG. 5 is an end elevational view of the check valve as seen from the left-hand side of FIG. 4.

The door closer which is shown in FIGS. 1 and 2 comprises an elongated housing or cylinder 10 having an elongated longitudinally extending cylindrical internal space 11 for an elongated damping piston 17. One end of the space 11 is sealed by an integral end wall 12 of the housing 10 and the other end of the space 11 is sealed by an externally threaded plug 13 which is installed in and mates with the housing 10.

The housing 10 is further provided with two registering stepped bores whose axes extend transversely of the internal space 11 and which contain sealing elements as well as bearings for a rotary member 14 here shown as a shaft. That portion of the shaft 14 which is located in the space 11 is provided with a gear 15 mating with a toothed rack 20 of the piston 17. If the housing 10 is mounted on a door panel, the shaft is connected with a link or arm (not shown) which can be guided by a rail or the like the door frame. Reference may be had to commonly U.S. Pat. No. 4,658,468 granted April 21, 1987 to Tillmann et al. for "Door check". Each end portion of the shaft 14 can include a polygonal stub 16 which ensures that the respective end portion can be nonrotatably secured to the aforementioned link or arm.

The piston 17 is reciprocable in the internal space 11 and includes a first end portion or head 18 which is nearer to the plug 13 and a second end portion or head 19 which is nearer to the end wall 12 of the housing 10. The purpose of the head 18 is to damp the movement of the door panel to its closed position, and the purpose of the head 19 is to damp the movement of the door panel to its open position. The toothed rack 20 forms part of or constitutes a connector between the heads 18, 19 of the piston 17. These heads are disposed at opposite sides of the shaft 14 whose axis extends at right angles to the common axis of the heads 18, 19 and the space 11. The gear 15 and the rack 20 constitute a means for transmitting motion between the shaft 14 and the piston 17 in such a way that, when the piston 17 is caused to move in the space 11, the shaft 14 is compelled to rotate about its axis and that rotation of the shaft 14 entails a movement of the piston 17 in the space 11.

The head 18 of the piston 17 contains a check valve 21 which can permit a fluid (e.g., oil) in the space 11 to flow from a non-pressurized compartment 23 between the heads 18, 19 into a chamber 22 (FIG. 3) between the head 18 and the plug 13 when the pressure of fluid in the compartment 23 exceeds the pressure in the chamber 22. The check valve 21 closes automatically when the pressure of fluid in the chamber 22 rises to exceed the pressure in the compartment 23. The housing 10 has a passage which establishes a path for the flow of fluid between the compartment 23 and the chamber 22, e.g., in a manner as shown in commonly owned U.S. Pat. No. 4,660,250 granted April 28, 1987 to Tillmann et al. for "Door closer". The just discussed passage in the housing 10 contains a throttle valve which is adjacent the plug 13 and serves to restrict the flow of fluid in that portion of the passage which communicates with the chamber 22 during pivoting of the door panel to its closed position.

The head 19 of the piston 17 and the end wall 12 of the housing 10 define a second chamber 27 which contains a set of coil springs 25 (e.g., of the type disclosed in U.S. Pat. No. 4,658,468) which bias the head 19 in a direction toward the shaft 14 and ensure that the head 19 can damp the movement of the door panel to its open position. The bias of the springs 25 is adjustable by a disc-shaped retainer 26 which is adjacent the end wall 12 and is movable toward or away from this end wall by a mechanism similar to or identical with that disclosed in U.S. Pat. No. 4,658,468. The pressure in the chamber 27 rises during movement of the door panel to its open position, and the fluid which fills the chamber 27 is then free to escape into the compartment 22 by way of an axially parallel channel 28 in the housing 10. The illustrated channel 28 is an axially parallel blind bore which is machined into the housing 10, the open end of which is sealed by a plug 28*a*, which communicates with the compartment 23 close to the shaft 14 by way of a first port 28*b*, and which communicates with the chamber 27 by way of two additional ports 29, 30 in the housing 10.

The location of the port 29 in the housing 10 is selected in such a way that the head 19 of the piston 17 seals this port when the door panel completes an angular movement through approximately 70° from its closed toward its fully open position. Moreover, the cross-sectional area of the port 29 is selected in such a way that this port does not throttle the flow of fluid between the chamber 27 and the channel 28 while the inner end of this port remains unobstructed.

The port 30 is remote from the shaft 14 so that it cannot be sealed by the head 19 of the piston 17, i.e., the port 30 continues to establish communication between the channel 28 and the chamber 27 even when the door panel is pivoted to the fully open position and the head 19 is located at a maximum distance from the shaft 14. Fluid which flows between the channel 28 and the port 30 must flow through a throttle valve 31. The valve 31 is shown in FIG. 2; it can be fully closed to prevent the flow of fluid between the channel 28 and the chamber 27 by way of the port 30. The setting of the throttle valve 31 determines the extent to which the movement of the door panel to its open position is damped by the piston 17 and by the fluid in the internal space 11 of the housing 10. It is possible to omit the port 30 and the throttle valve 31 without departing from the spirit of the present invention.

The head 19 of the piston 17 contains a check valve 24 which closes when the pressure in the chamber 27 exceeds the pressure in the compartment 23 between the piston heads 18 and 19. In other words, the check valve 24 is closed during opening of the door panel, and this check valve opens to permit the fluid to flow between the chamber 27 and the compartment 23 during pivoting of the door panel to its closed position.

The head 19 of the piston 17 is further provided with a bypass 32 which, in the embodiment of FIGS. 1 and 2, includes a groove 33 machined into the peripheral surface of the head 19 and having a cross-sectional area which increases in a direction from the chamber 27 toward the compartment 23. The illustrated groove 33 has a substantially triangular cross-sectional outline and its depth (as measured radially of the head 19) and its width (as measured in the circumferential direction of the head 19) increase gradually from the chamber 27 toward the compartment 23. The surface bounding the groove 33 is a flow restrictor which opposes unobstructed flow of fluid between the compartment 23 and the chamber 27 when the piston 17 is caused to move in the internal space 11 of the housing 10.

In the embodiment of FIG. 3, the bypass 32 again comprises a groove 34 which, however, is provided in the peripheral surface of the body of the check valve 24 and whose cross-sectional area also increases in a direction from the chamber 27 toward the compartment 23. In each of the two illustrated embodiments of the improved door closer, the pressure of fluid which flows in the grove 33 or 34 of the respective bypass 32 decreases as the fluid flows from the chamber 27 toward and into the compartment 23 due to the aforediscussed design of the groove, namely that the groove ensures a reduction of pressure upon the fluid flowing into the compartment 23.

It is clear that the bypass 32 can also include two or more grooves, that all of the grooves need not have identical cross-sectional outlines, and that each such groove can be bounded by a semicylindrical, U-shaped or otherwise configurated surface without departing from the spirit of the invention.

The operation is as follows:

When the door panel is caused to leave its closed position (in which the piston 17 assumes a position corresponding to that shown in FIG. 1), the piston 17 moves toward the end wall 12 of the housing 10 and its head 19 expels fluid from the chamber 27 into the port 29 and thence into the compartment 23 by way of the channel 28 and port 28*b*. As the head 19 advances toward the end wall 12, it reaches a position in which its peripheral surface seals the inner end of the port 29 from the chamber 27. In order to move the door panel from the closed position toward the open position, the person in charge or a vehicle must overcome the resistance of the springs 25 which react against the retainer 26 and bear against the head 19 of the piston 17. As mentioned above, the arrangement may be such that the door panel must be pivoted through an angle of approximately 70° before the head 19 of the piston 17 seals the chamber 27 from the port 29 in the housing 10. If the door panel is to be pivoted beyond such partially open or intermediate position, it is necessary to apply a somewhat greater force because, if the throttle valve 31 between the port 30 and the channel 28 is closed (or if the valve 31 and the port 30 are omitted), fluid can flow from the chamber 27 into the compartment 23 only through the bypass 32 (groove 33 or 34). If the pivotal movement of the door panel beyond the intermediate position (in which the head 19 seals the port 29 from the chamber 27) is relatively slow, the resistance which the fluid encounters to flow through the groove 33 or 34 of the respective bypass 32 is relatively small. In other words, the force which is required to pivot the door panel beyond the intermediate position at an angle of approximately 70° from the closed position need not appreciably exceed the force which is required to pivot the door panel from the closed position to the position at or close to the angle of 70° from closed position. The resistance which the door panel offers to pivoting beyond the position at an angle of approximately 70° from closed position increases proportionally with the speed of such pivoting movement The throttling action of the bypass 32 can be readily selected in such a way that, if the door panel is abruptly pushed beyond the position at an angle of approximately 70° from closed position, it simply ceases to continue such pivotal movement irrespective of the velocity at which the door panel was pivoted to reach such angular position. Moreover, the door panel normally comes to a halt in one and the same position irrespective of the amount of energy which is consumed to push or pull it beyond the aforediscussed intermediate position (e.g., at an angle of approximately 70° from the closed position).

When the pivoting of the door panel toward or to its open position is terminated, the springs 25 are free to dissipate energy and to return the door panel to the closed position In other words, the piston 17 moves back toward the position which is shown in FIG. 1.

It will be noted that the bypass 32 is effective irrespective of whether or not the door closer is equipped with a throttle valve 31 and irrespective of whether or not the throttle valve 31 is open, partially open or closed.

An advantage of a bypass wherein the cross-sectional area of the path for the flow of fluid from the chamber 27 into the compartment 23 increases in a direction toward the compartment is that the pressure at the inlet to the groove 33 or 34 cannot reach a value at which the fluid would be prevented from entering the bypass. This is due to the fact that the pressure of fluid in the groove 33 or 34 can decrease steadily in a direction from the chamber 27 toward the compartment 23. Thus, the resistance which the fluid encounters to the flow into the compartment 23 decreases steadily to thus prevent an excessive buildup of fluid pressure in the chamber 27 and a buildup of pressure at the inlet to the groove 33 or 34 to a level exceeding the pressure of fluid which surround the springs 25.

As mentioned above, the resistance which the door panel offers to pivoting toward its fully open position during pivoting beyond the intermediate position (when the head 19 seals the inner end of the port 29 and the fluid is compelled to escape from the chamber 27 by flowing through the groove 33 or 34) is only slightly (if at all) greater than the resistance during pivoting of the door panel from the closed to the intermediate position if the door panel is pivoted slowly beyond the intermediate position. In other words, under such circumstances, the force which is applied to the door panel to continue the pivotal movement beyond the intermediate position is merely required to overcome the resistance of the springs 25 which store energy as the head 19 moves toward the end wall 12 of the housing 10.

If the door panel is abruptly pushed from the closed position, the fluid in the chamber 27 does not or need not offer any (or does not or need not offer any appreciable) resistance to movement of the panel to the intermediate position; all that is necessary is to overcome the resistance of the springs 25 because the cross-sectional area of the port 28b, channel 28 and port 29 is preferably such as to ensure that the pressure of fluid flowing from the chamber 27 into the compartment 23 by way of the channel means 28, *28b*, 29 does not rise at all or rises only negligibly. The hydraulic damping action sets in when the head 19 seals the inner end of the port 29 so that the fluid which fills the chamber 27 can escape only by way of the groove 33 or 34 of the respective bypass 32. As mentioned above, the hydraulic damping action is more pronounced in response to pivoting of the door panel at a higher speed beyond the intermediate position. Such damping action can bring about a stoppage of the door panel before the latter reaches the fully open position, and the springs 25 then begin to dissipate energy in order to return the door panel to the closed position.

The feature that the damping action is proportional to the speed of pivotal movement of the door panel beyond the intermediate position is desirable and advantageous because intentional relatively slow pivoting of the door panel beyond the intermediate position encounters little resistance by the hydraulic fluid which leaves the chamber 27 via groove 33 or 34. On the other hand, the hydraulic damping action is very pronounced when the door panel is abruptly pivoted from closed position; this ensures that the door panel and/or the hinges for the door panel will not be damaged as a result of propulsion of the door panel against a stop in the fully open position.

The bypass can include a groove (or two or more grooves) in the peripheral surface or in any other part of the head 19 and/or in the body of the check valve 24 in the head 19. The locus or loci of one or more grooves or otherwise shaped passages which provide one or more paths for the flow of fluid from the chamber 27 into the compartment 23 will be selected in such a way that the bypass can be formed at a reasonable cost and with a sufficiently high degree of accuracy in order to permit predictable damping of the flow of fluid from the chamber 27 when the inner end of the port 29 is sealed by the head 19 but the piston 17 continues to move toward the end wall 12 of the housing 10.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for controlling movements of a door panel or a like component between open and closed positions, comprising a housing having a fluid-containing space; a piston having a peripheral surface and being installed in said housing for movement in a first direction during movement of said component from closed position and in a second direction during movement of the component toward closed position, said piston dividing said space into a chamber and a compartment and said piston being arranged to expel fluid from said chamber during movement in said first direction; channel means provided in said housing and defining a first path for the flow of fluid from said chamber into said compartment during a first stage of movement of the piston in said first direction; a check valve provided in said piston and arranged to provide a second path for the flow of fluid from said compartment into said chamber, said valve including a body having a peripheral surface; and a bypass including a groove provided in one of said peripheral surfaces and defining a third path for the flow of fluid from aid chamber into said compartment during a second stage of movement of said piston in said first direction, the cross-sectional area of aid third path increasing in a direction from said chamber toward said compartment.

2. The apparatus of claim 1, wherein said groove is provided in said peripheral surface of said piston.

3. The apparatus of claim 1, wherein said groove is provided in said peripheral surface of said body.

4. The apparatus of claim 1, wherein said a groove has a substantially triangular cross-sectional outline.

5. The apparatus of claim 1, wherein said groove has a depth which increases in a direction from said chamber toward said compartment.

6. The apparatus of claim 1, wherein said groove has a width which increases in a direction from said chamber toward said compartment.

7. The apparatus of claim 1, wherein the minimum cross-sectional area of said first path exceeds the minimum cross-sectional area of said third path.

8. The apparatus of claim 1, further comprising means for biasing said piston in said second direction, said biasing means being provided in said chamber.

9. The apparatus of claim 1, wherein said piston includes a portion which seals said channel means from said chamber during said second stage of movement of said piston in said first direction.

10. The apparatus of claim 1, further comprising a rotary member journalled in said housing and means for transmitting motion between said rotary member and said piston so that the piston moves in said housing in response to rotation of said rotary member and said rotary member rotates in response to movement of said piston in said housing.

11. The apparatus of claim 10, further comprising means for connecting the component with said rotary member.

12. The apparatus of claim 10, wherein said motion transmitting means comprises a toothed rack on said piston and a gear provided on said rotary member and mating with said rack.

* * * * *